(12) United States Patent
Chen et al.

(10) Patent No.: US 12,345,998 B2
(45) Date of Patent: Jul. 1, 2025

(54) TUNABLE OPTICAL WEDGE FOR REDUCING CROSSTALK IN WAVELENGTH SELECTIVE SWITCH

(71) Applicant: II-VI Delaware, Inc., Wilmington, DE (US)

(72) Inventors: Helen Chen, Cupertino, CA (US); Guomin Jiang, Wilmington, DE (US); Tom Li, Wilmington, DE (US); Lawrence Wang, Wilmington, DE (US); Jim Yuan, Wilmington, DE (US)

(73) Assignee: II-VI DELAWARE, INC., Wilmington, DE (US)

( * ) Notice: Subject to any disclaimer, the term of this patent is extended or adjusted under 35 U.S.C. 154(b) by 406 days.

(21) Appl. No.: 17/805,342

(22) Filed: Jun. 3, 2022

(65) Prior Publication Data

US 2023/0393445 A1    Dec. 7, 2023

(51) Int. Cl.
| | |
|---|---|
| G02F 1/29 | (2006.01) |
| G02F 1/313 | (2006.01) |
| H04J 14/02 | (2006.01) |
| H04Q 11/00 | (2006.01) |

(52) U.S. Cl.
CPC ............ *G02F 1/292* (2013.01); *G02F 1/3131* (2013.01); *H04J 14/0212* (2013.01); *H04Q 11/0005* (2013.01); *G02F 2201/305* (2013.01); *H04Q 2011/0018* (2013.01)

(58) Field of Classification Search
CPC .. G02F 1/292; G02F 2201/305; G02F 1/3131; H04J 14/0212; H04Q 11/0005; H04Q 2011/0018; H04Q 2011/0039; G02B 6/3588; G02B 6/356
See application file for complete search history.

(56) References Cited

U.S. PATENT DOCUMENTS 5,801,798 A * 9/1998 Chen ................... G02F 1/13471
349/74
6,552,696 B1 * 4/2003 Sievenpiper ............. H01Q 3/44
343/754

(Continued)

FOREIGN PATENT DOCUMENTS

CN          102073174 A       5/2011
CN          112269226 A  *    1/2021   ......... G02B 27/0012

*Primary Examiner* — Pranesh K Barua
(74) *Attorney, Agent, or Firm* — Blank Rome LLP

(57) ABSTRACT

In a wavelength selective switch, an input port transmits an input beam, and diffraction grating disperses the input beam into optical channels. A liquid-crystal-on-silicon (LCoS) switch assembly has a phase grating profile and has addressable pixels, which are liquid crystal based. The LCoS switch assembly can selectively direct first-order diffracted beams of the optical channels for output to selected output ports. A tunable optical wedge adjacent the LCoS switch assembly can direct higher-order diffraction beams in the space between the output ports to reduce crosstalk. The wedge is a liquid crystal cell having spaced-apart resistive layers and having liquid crystal material disposed between the layers. In the wedge, the liquid crystal material can produce a phase profile in response to bias voltages applied to the resistive layers, and a beam steering angle of the phase profile can direct at least the second-order diffracted beams towards the port spacing between the ports.

21 Claims, 6 Drawing Sheets

(56) References Cited

U.S. PATENT DOCUMENTS

| | | | | |
|---|---|---|---|---|
| 7,603,006 | B2* | 10/2009 | Cai | G02B 6/3528 |
| | | | | 385/16 |
| 10,890,823 | B1* | 1/2021 | Jiang | G02B 27/0172 |
| 11,016,441 | B2 | 5/2021 | Gao et al. | |
| 2011/0109869 | A1* | 5/2011 | Li | G02F 1/31 |
| | | | | 349/196 |
| 2012/0328291 | A1* | 12/2012 | Frisken | H04Q 11/0005 |
| | | | | 398/48 |
| 2013/0194537 | A1* | 8/2013 | Mao | G02F 1/31 |
| | | | | 349/196 |
| 2014/0023316 | A1* | 1/2014 | McLaughlin | G02B 6/3548 |
| | | | | 385/17 |
| 2014/0285867 | A1* | 9/2014 | Wagener | G02B 6/293 |
| | | | | 359/279 |
| 2014/0321796 | A1* | 10/2014 | Ohtsuka | G02B 6/356 |
| | | | | 385/3 |
| 2017/0075075 | A1 | 3/2017 | Frisken | |
| 2017/0214482 | A1 | 7/2017 | Frisken | |
| 2018/0059431 | A1* | 3/2018 | Yang | G02F 1/1393 |
| 2020/0264379 | A1* | 8/2020 | Frisken | G02B 26/0833 |
| 2023/0296842 | A1* | 9/2023 | Zhang | G02B 6/29395 |
| | | | | 359/558 |

* cited by examiner

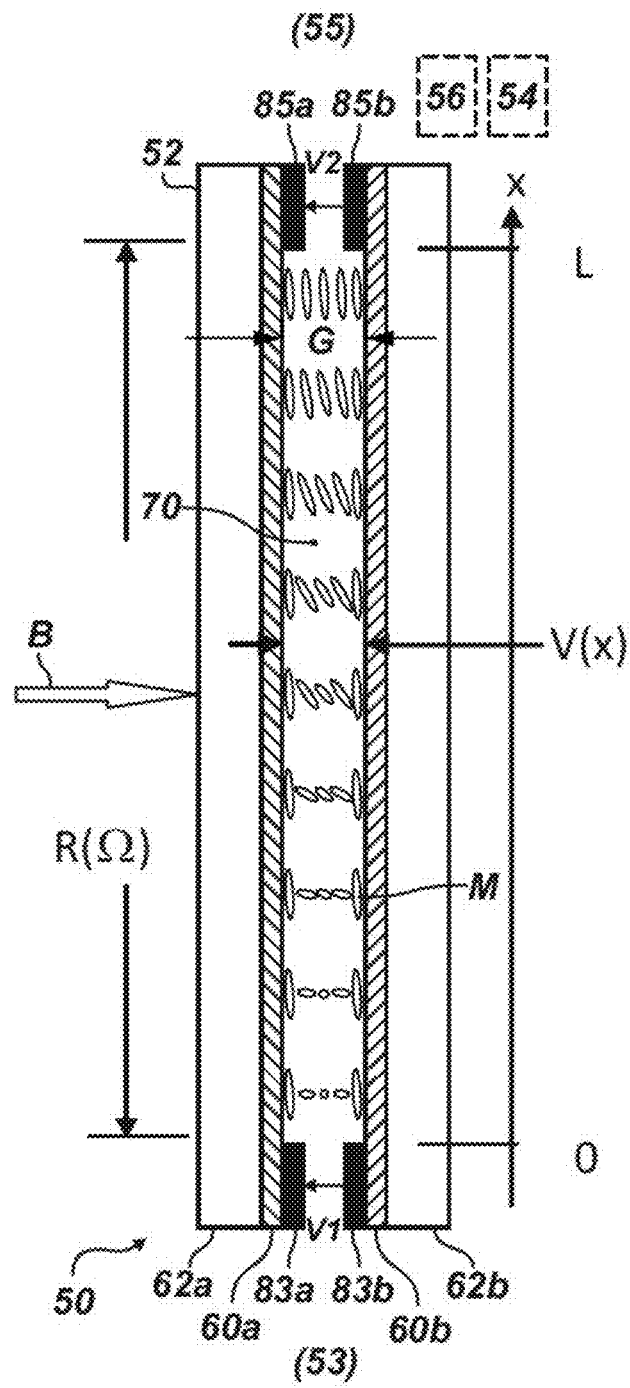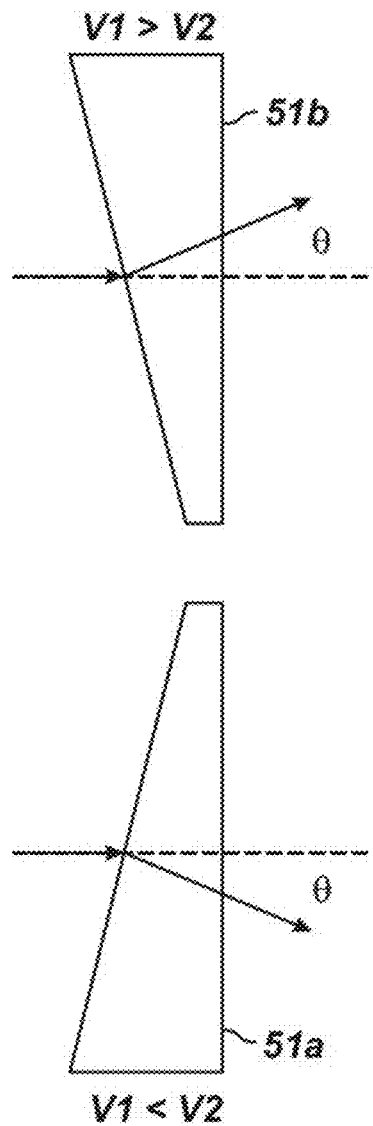
FIG. 3A
FIG. 3B

TUNABLE OPTICAL WEDGE FOR REDUCING CROSSTALK IN WAVELENGTH SELECTIVE SWITCH

BACKGROUND OF THE DISCLOSURE

A wavelength selective switch (WSS) module is used in the art to select wavelengths for optical channels. In general, the WSS module can have a fiber array, various imaging optics, a diffraction grating, and a switch assembly. In general, the switch assembly can be based on a MEMS system, a liquid-crystal-on-silicon (LCoS) switch assembly, a liquid-crystal (LC) switch assembly, or another technology. In current WSS modules, the incident angle of the input light is controlled using an LCoS or LC switch assembly for the switch assembly.

Accurate alignment of the optical components in the WSS module avoids unwanted diffraction orders from getting into the output ports of the WSS module. This alignment process takes time to perform and is fixed after the WSS module is fabricated and sealed. Therefore, the alignment cannot be readily adjusted if an incident angle changes after the stabilization process. Instead, a rework process has to be done by cutting open the sealed WSS module and readjusting the alignment.

For example, the incident angle on the LCoS switch assembly is first controlled during the base alignment of the optical components in the WSS module to avoid crosstalk. In one technique, the unwanted diffraction orders are directed entirely away from the range of the output ports in the WSS module using the LCoS switch assembly. However, this technique can suffer high diffraction losses from the LCoS switch assembly because large steering angles are required.

In another more common technique, the unwanted diffraction orders are directed to the middle of two output ports in the WSS module using the LCoS switch assembly. This technique produces lower diffraction losses because large steering angles are not required. However, the incident angle may change after the base alignment has been completed. As a result, the unwanted diffraction orders may hit the output ports and cause crosstalk. Operators can only rework the WSS module to correct the incident angle and reduce crosstalk.

The subject matter of the present disclosure is directed to overcoming, or at least reducing the effects of, one or more of the problems set forth above.

SUMMARY OF THE DISCLOSURE

An apparatus disclosed herein comprises a plurality of ports, a selective switch, and a tunable optical wedge. The ports are separated by port spacing, and at least one of the ports is configured to transmit an input beam. The selective switch is configured to selectively direct a first order of a beam diffracted from the input beam for output to a selected one of the other ports. The tunable optical wedge is arranged in optical communication with the selective switch. The tunable optical wedge is configured to direct a higher order of the diffracted beam towards the port spacing between the ports.

For the apparatus, the selective switch can comprise a dispersion element and a switch assembly. The dispersion element can be arranged in optical communication with the input beam from the at least one port and can be configured to disperse the input beam into optical channels. The switch assembly can be arranged in optical communication with the optical channels from the dispersion element. The switch assembly can be liquid crystal based and can have a plurality of pixels, which are individually addressable to create a reconfigurable phase grating profile. The reconfigurable phase grating profile of the pixels can be configured to selectively direct the first order of one or more of the beams of one or more of the optical channels diffracted from the switch assembly for output to selected one or more of the other ports. The tunable optical wedge can be arranged in optical communication with the switch assembly. In this way, the tunable optical wedge can be configured to direct the higher order of the one or more diffracted beams towards the port spacing between the ports.

A wavelength selective switch is disclosed herein and comprises: a plurality of ports, a dispersion element, a switch assembly, and a tunable optical wedge. The ports at least include at least one input port and two or more output ports. The at least one input port is configured to transmit an input beam, and the ports are separated by port spacing. The dispersion element is arranged in optical communication with the input beam from the at least one input port and is configured to disperse the input beam into optical channels.

The switch assembly is arranged in optical communication with the optical channels from the dispersion element. The switch assembly is liquid crystal based and has a plurality of pixels, which are individually addressable to create a reconfigurable phase grating profile. The reconfigurable phase grating profile of the pixels is configured to selectively direct a first order of one or more diffracted beams of one or more of the optical channels from the switch assembly for output to selected one or more of the output ports. The tunable optical wedge is arranged in optical communication with the switch assembly. The tunable optical wedge is configured to direct a higher order of the one or more diffracted beams towards the port spacing between the ports.

A method disclosed herein is directed to processing an input beam. The method comprises: transmitting the input beam from at least one input port of a plurality of ports, the ports at least including the at least one input port and two or more output ports, the ports being separated by a port spacing; dispersing the input beam into optical channels; selectively directing a first order of one or more diffracted beams of one or more of the optical channels by individually addressing pixels to create a reconfigurable phase grating profile, and outputting the first order thereof to selected one or more of the output ports; and directing at least a second order of the one or more diffracted beams towards the port spacing between the ports by applying bias voltages to resistive layers and producing a phase profile in liquid crystal material between the resistive layers in response to the applied bias voltages.

The foregoing summary is not intended to summarize each potential embodiment or every aspect of the present disclosure.

BRIEF DESCRIPTION OF THE DRAWINGS

FIG. 3A illustrates a schematic side view of a tunable optical wedge according to the present disclosure.

FIG. 3B schematically illustrates optical equivalents of the tunable optical wedge in two states.

DETAILED DESCRIPTION OF THE DISCLOSURE

Figure 1:
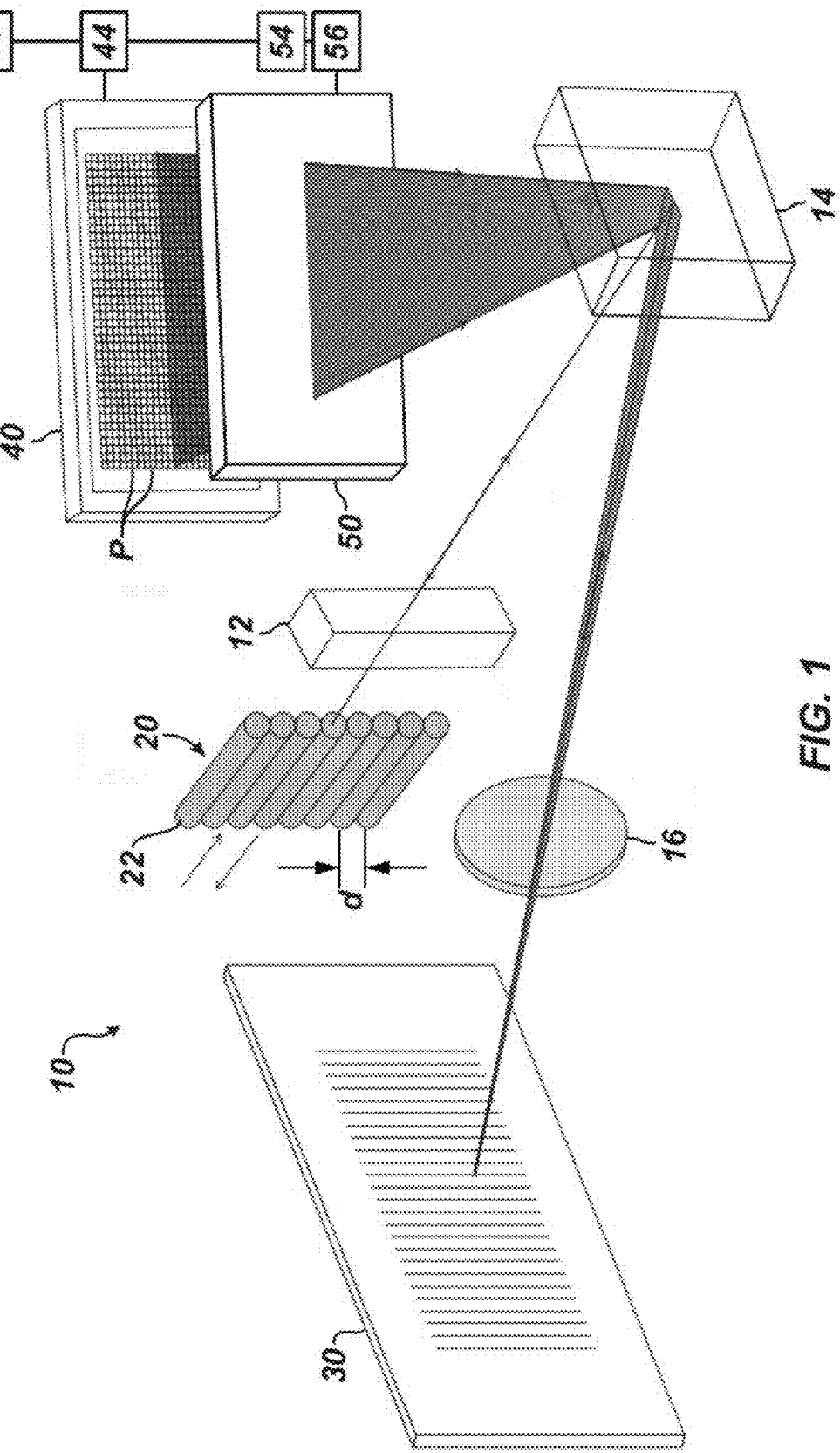
FIG. 1 illustrates a schematic view of a wavelength selective switch module according to the present disclosure.

FIG. 1 illustrates a schematic perspective view of a wavelength selective switch (WSS) module 10 according to the present disclosure. In general, the WSS module 10 has a fiber array 20, polarization diversity optics 12, an imaging mirror 14, imaging optics 16, a dispersion element 30, and a switch assembly 40. The fiber array 20 includes input/output fibers for input/output ports 22 of the WSS module 10.

During operation, the input/output ports 22 transmit and receive optical signals, which can be collimated by collimators (not shown). The collimators may be an aspherical lens, an achromatic lens, a doublet, a GRIN lens, a laser diode doublet, or a similar collimating lens. For example, an input signal passes from an input port 22 through the polarization diversity optics 12, which control the polarization of the signals and minimize polarization-dependent effects. The input signal is then directed to the dispersion element 30, which spatially separates the constituent wavelength channels of the input signal. The dispersion element 30 can be a diffraction grating as shown or can be some other element, such as a prism.

The spatially separated wavelength channels are then focused onto the switch assembly 40, which can selectively direct the spatially separated wavelength channels for eventual passage to selected ones of the output ports 22. The switch assembly 40 includes at least one switch engine being liquid crystal based. For example, the switch assembly 40 in FIG. 1 is a liquid-crystal-on-silicon (LCoS) switch assembly. The imaging mirror 12 and other imaging optics 16 manipulate the optical signals for appropriate incidence onto the diffraction grating 30 and the LCoS switch assembly 40.

The WSS module 10 in FIG. 1 is presented as an example. Other WSS modules according to the present disclosure may have different configurations. In some implementations of the WSS module 10, the polarization diversity optics 12 can separate the input signal into two co-polarized beams, and an anamorphic optic can expand the input signal into an elliptical beam spot onto the dispersion element 30. In turn, the dispersion element 30 can spread the input signal into angularly separated wavelengths, and a Fourier lens can transform the angular separation to spatial separation directed to the LCoS switch assembly 40, which has a reconfigurable phase grating profile that modulates the light. Different wavelengths of light are projected into different parts of the LCoS switch assembly 40. In the return, the dispersion element 30 recombines all of the different wavelengths diffracted by the LCoS switch assembly 40 onto individual output ports 22. In this way, different wavelengths of the optical signal can be selectively directed to selected ones of the output ports 22.

Figure 2:
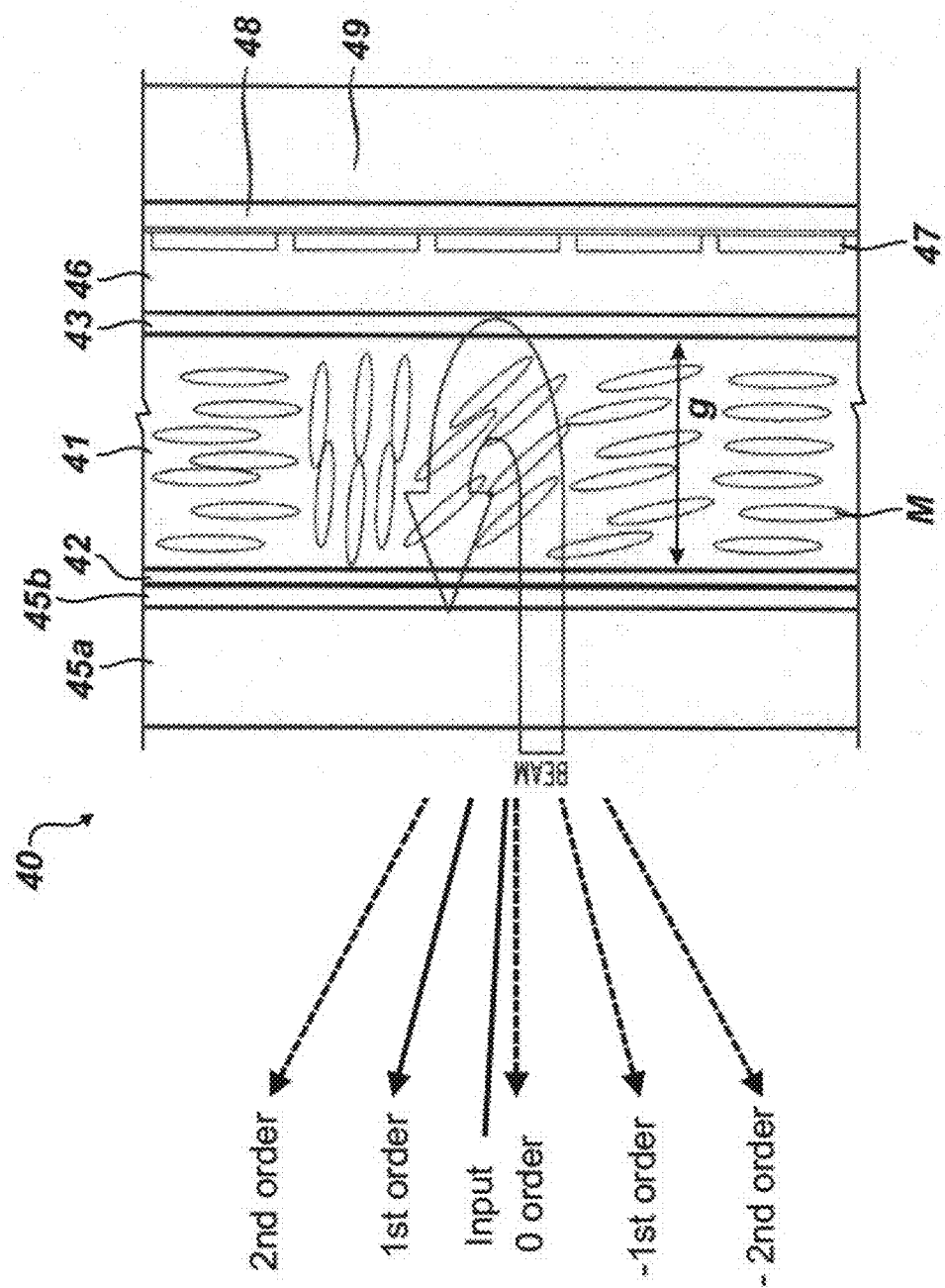
FIG. 2 illustrates a diagram of diffraction orders from a phase grating profile of an LCoS switch assembly.

In general and as described in more detail in FIG. 2, the LCoS switch assembly has liquid crystal (LC) material sandwiched between a transparent glass layer (having a transparent electrode) and a silicon substrate. The transparent glass layer has a transparent electrode. The silicon substrate has a two-dimensional (2D) array of pixels P and has CMOS circuitry (not shown) used for individually driving the pixels P. A voltage signal provides a local phase change to an optical signal, thereby offering a two-dimensional array of phase manipulating regions that creates the phase grating profile of the LCoS switch assembly 40.

The electrodes for the pixels P can be finely patterned. The separation between pixels P can be very small, and the LC material can be a continuous medium in the LCoS switch assembly 40. The electric field applied by the pixel's electrodes to the birefringent LC material varies the orientation of the crystals to direct the path of an optical beam. During use, each pixel P can be electronically addressed/controlled on an individual basis so the pixel P can cause local phase retardation. The phase grating profile produced by the pixels P of the LCoS switch assembly 40 can then diffract all or a part of the light. For example, the phase grating profile of the LCoS switch assembly can diffract light to one or more of the output ports 22 or can diffract light to a dumped position between the output ports 22 for blocking or attenuating the light.

The individually addressable nature of the LCoS pixels P allows a dynamic phase grating profile to be created, which selectively steers each wavelength channel to a desired output port 22 and which also modifies the spectral shape of the channels to perform various optical manipulation effects. In this way, individual spectral components spatially separated by a diffractive element, such as the diffraction grating (30), can be manipulated at predetermined regions of the LCoS switch assembly 40 depending on the LC material's birefringent state of the associated region.

The signals incident on the LCoS switch assembly 40 will be reflected at various diffraction orders due to the phase grating profile of the LCoS switch assembly 40. For example, FIG. 2 illustrates a diagram of some of the diffraction orders from the phase grating profile produced by an LCoS switch assembly 40, which is shown in a simplified side view.

As shown here and briefly noted above, the LCoS switch assembly 40 includes a liquid crystal layer 41 disposed in a cell gap G between alignment layers 42 and 43. A cover glass 45a and transparent electrode 45b are positioned next to the alignment layer 42. Meanwhile, a CMOS circuit substrate 46 is positioned adjacent the opposite alignment layer 43. The CMOS circuit substrate 46 has a plurality of pixel electrodes 47, which are separately addressable and are arranged in a desired two-dimensional array. A reflective lower surface 48 of the CMOS circuit substrate 46 may be included to improve the optical efficiency of the array.

A control layer 49 provides the electrical interface between the pixel electrodes 47 and an external control structure (not shown) that defines the specific, reconfigurable phase grating profile. The voltages applied to the individual pixel electrodes 47 cause individual molecules M within the liquid crystal layer 41 to rotate and create a specific phase grating profile (hologram) that steers a beam toward a selected output port (22; FIG. 1). For example, a corresponding pixel sector (i.e., a portion of a linear pixel array) is controlled via applied electrical signals to display a hologram (phase grating profile) that directs/steers the first-order diffracted beam into the output port (22; FIG. 1).

During operation, different voltages are loaded on different individual pixel electrodes 47 of the LCoS switch assembly 40. The different voltages correspond to different phase delays due to the birefringent effect of the LC material in the LC layer 41. Accordingly, the LCoS pixel array can be configured to exhibit the properties of a blazed grating. A diffraction angle of incident light may be controlled merely by changing the grating period of this pseudo-blazed grating, which is provided by adjusting the voltages applied to the various LCoS pixels P. This voltage adjustment allows diffractive light to be output at different ports (22) of the WSS module (10), implementing a WSS function.

In general, the pixel pattern can create periodic grating holograms corresponding to linear or blazed gratings. For example, a periodic, stepped phase shift profile can be produced across a region of the LCoS switch assembly 40 to produce a cumulative phase profile, also referred to as a cumulative steering profile. This steering profile is produced by driving each individual pixel P with a predetermined voltage to provide the desired phase change. The periodic nature of the phase is utilized to reduce the required drive voltage. Therefore, a periodic, stepped voltage signal will produce the periodic, stepped phase shift profile, which in turn produces the cumulative phase profile. When acting on an individual wavelength component, the phase profile provides a steering angle. Accordingly, by proper adjustment of the periodic, stepped phase shift profile, the wavelength components can be selectively directed to a desired one or more of the selected output ports (22).

During operation, however, the phase grating profile of the LCoS switch assembly 40 naturally creates unwanted diffraction orders. When the input power from a communication port (22) of the WSS module (10) is diffracted by the phase profile of the LCoS switch assembly 40, the main power from the input can be switched to the desired output port (22) using first-order diffraction. Due to the imperfections in the phase profile, however, there is always some power at the unwanted diffraction orders, such as second-order diffraction and higher. The second-order diffraction is typically the only order of concern because the power at higher orders can be relatively low in comparison. The second-order diffraction may cause more crosstalk in the ports (22) if the unwanted diffraction orders are steered close to the module's ports (22). (In the discussion that follows, the second-order diffraction is used as an example of the unwanted diffraction orders, but higher orders can also be addressed according to the present disclosure.)

As noted in the background, accurate alignment of the optical components of the WSS module 10 in FIG. 1 attempts to avoid unwanted diffraction orders from getting into the output ports 22 of the WSS module 10. This alignment process takes time to perform and is fixed after the WSS module 10 is fabricated and sealed. However, incident angles may change after the stabilization process. As a result, unwanted diffraction orders may hit the output ports 22 and produce crosstalk after the WSS module 10 has been sealed.

Crosstalk occurs when unwanted higher-order diffracted light (i.e., other than the first order) is coupled to an output port 22 that has not been purposefully selected in the routing by the WSS module 10. Crosstalk can occur at a component level. For example, the phase grating profile of the LCoS switch assembly 40 can have diffraction inefficiencies and imperfections that cause higher-order diffracted beams to be unintentionally coupled to output ports 22. Crosstalk produced at the component level can typically be handled through electronic control of the LCoS switch assembly 40.

In contrast, crosstalk at the module level is produced by the spatial arrangement and optical coupling between the module's components. For example, the positions of the fibers for the output ports 22, the apertures of any lenses, the field spot of light on the LCoS switch assembly 40, the pitch of the gratings used, and other spatial characteristics affect the optical coupling in the WSS module 10. The module's spatial arrangement is initially designed to minimize crosstalk so that any coupling efficiency for higher-order diffracted light is preferably low. All the same, any inaccuracies, variations, changes, and the like that occur at the module level can alter the optical coupling between the module's components and produce crosstalk.

To adjust for changes in the incident angles and to reduce crosstalk from the unwanted diffraction orders reaching output ports 22, the WSS module 10 as shown in FIG. 1 includes a tunable optical wedge 50, which is used in conjunction with the LCoS switch assembly 40. In general and as described in more detail below, the tunable optical wedge 50 can steer unwanted diffraction orders away from the output ports 22 by steering the unwanted beam in the space (d) between the ports 22, for example.

Typically, the LCoS switch assembly 40 has control circuitry 44 to control and drive the operation of the assembly 40. The tunable optical wedge 50 can also have control circuitry 54, 56 to control and drive the operation of the wedge 50. This control circuitry 44, 54, 56 can be part of or connected to any module-level control circuitry 15 for the WSS module 10.

FIG. 3A illustrates a schematic side view of a tunable optical wedge 50 according to the present disclosure. The tunable optical wedge 50 is created with a continuous and linear phase profile based on liquid crystal cells for active beam steering.

As schematically shown, the tunable optical wedge 50 includes a voltage-controlled liquid crystal (LC) cell 52 and an adjustable voltage source 56. The LC cell 52 includes a layered structure having a pair of resistive and transparent layers 60a-b supported on transparent plates 62a-b. A liquid crystal material 70 is contained within a cell gap G between the resistive layers 60a-b. While not specifically shown or discussed, thin layers of polyimide material can be disposed between the LC material and resistive layers 60a-b and can be used to create a "default" alignment of the LC molecules M in the absence of an applied voltage to the LC cell 52.

The application of controlled bias voltages at opposing side terminations 53 and of the LC cell 52 creates a specific linear change in orientation of the LC molecules M to provide a desired beam steering angle. As shown in FIG. 3A, the LC material 70 extends along a length L of the LC cell 52, and the orientation of the individual molecules M within the LC material 70 can change along the length L of the LC cell 52 (that is, from top to bottom as viewed in FIG. 3A).

The voltage-controlled LC cell 52 also includes a first pair of contact regions 83a-b formed on end portions of resistive layers 60a-b at the first side termination 53 of the LC cell 52. A second pair of contact regions 85a-b is similarly formed on end portions of the resistive layers 60a-b at the opposing side termination 55 of the LC cell 52. These contact regions 83a-b, 85a-b are typically formed of metal. Alternatively, the regions 83a-b, 85a-b can be formed of a heavily doped semiconductor material; indeed, it is possible to heavily dope the end regions of resistive layers 60a-b.

The adjustable voltage source 56 is coupled to the first and second pairs of contact regions 83a-b, 85a-b. The source 56 can apply a first bias voltage $V_1$ to the pair of spaced-apart resistive layers 60a-b via the first pair of contact regions 83a-b and can apply a second bias voltage $V_2$ to the pair of spaced-apart resistive layers 60a-b via the second pair of contact regions 85a-b.

The applied voltages are AC voltages, typically operating at a frequency of about 1 kHz. The "values" of the voltages $V_1$ and $V_2$ are to be understood as the RMS values of the AC voltages applied across the side terminations 53, 55. By changing one or both of the first and second AC bias voltages, the adjustable voltage source 56 can adjust a beam steering angle θ of a propagating optical beam B passing through the LC cell 52.

In particular, the presence of these bias voltages $V_1$ and $V_2$ at the terminations 53, 55 creates a continuous, linear voltage gradient V(x) across the lateral extent of the LC material 70. Depending on the resistance exhibited by the layers 60a-b, the presence of the bias voltages $V_1$ and $V_2$ creates a phase profile that functions as a "wedge" for the propagating beam B. The resulting phase profile of the tunable optical wedge 50 can thereby adjust the steering angle θ of the propagating beam B.

The pair of spaced-apart resistive layers 60a-b can comprise a pair of indium-tin-oxide (ITO) layers. The resistive layers 60a-b can have a constant width along a length L of the LC cell 52, providing a linear voltage variation along the LC cell 52. Alternatively, the resistive layers 60a-b can have a variable width along the length of the LC cell 52 to provide a nonlinear voltage variation along the LC cell 52.

A beam steering controller 54 can be coupled to the adjustable voltage source 54. The beam steering controller 54 is responsive to external commands associated with a defined beam steering angle θ and determines the first and second AC bias voltages $V_1$ and $V_2$ associated with the defined beam steering angle θ to be sent from the adjustable voltage source 56 to the contact regions 83a-b, 85a-b.

Further details of the tunable optical wedge 50 are disclosed in U.S. application Ser. No. 17/236,009, filed Apr. 21, 2021 and entitled "Tunable Optical Wedge for Beam Steering," which is incorporated herein by reference in its entirety.

During use, the tunable optical wedge 50 produces optical equivalents 51a-b, as schematically shown in FIG. 3B. One optical equivalent 51a of the optical wedge 50 is shown in a first voltage state ($V_1 < V_2$), and another optical equivalent 51b is shown in a second voltage state ($V_2 > V_1$). By adjusting the magnitude of the applied voltages $V_1$, $V_2$, tunable beam steering over a relatively wide range can be achieved.

The tunable optical wedge 50 disclosed here improves the efficiency and crosstalk (also called Port Isolation) performance of the WSS module 10. By using the tunable optical wedge 50, the input beam direction on the LCoS switch assembly 40 can be actively adjusted to control the positions of the diffraction orders to the space (d) between two output ports 22. This helps achieve optimum performance and makes automated alignment in the assembled WSS module 10 more feasible. Secondly, with the tunable optical wedge 50, the incident angles can be adjusted after the WSS module 10 is sealed. This will not only reduce the requirement on incident angle alignment in the front-end process and thus improve the alignment process efficiency but will also avoid the need to rework the assembled WSS module 10, which requires cutting open a sealed module, thus significantly reducing labor costs.

Figure 4A:
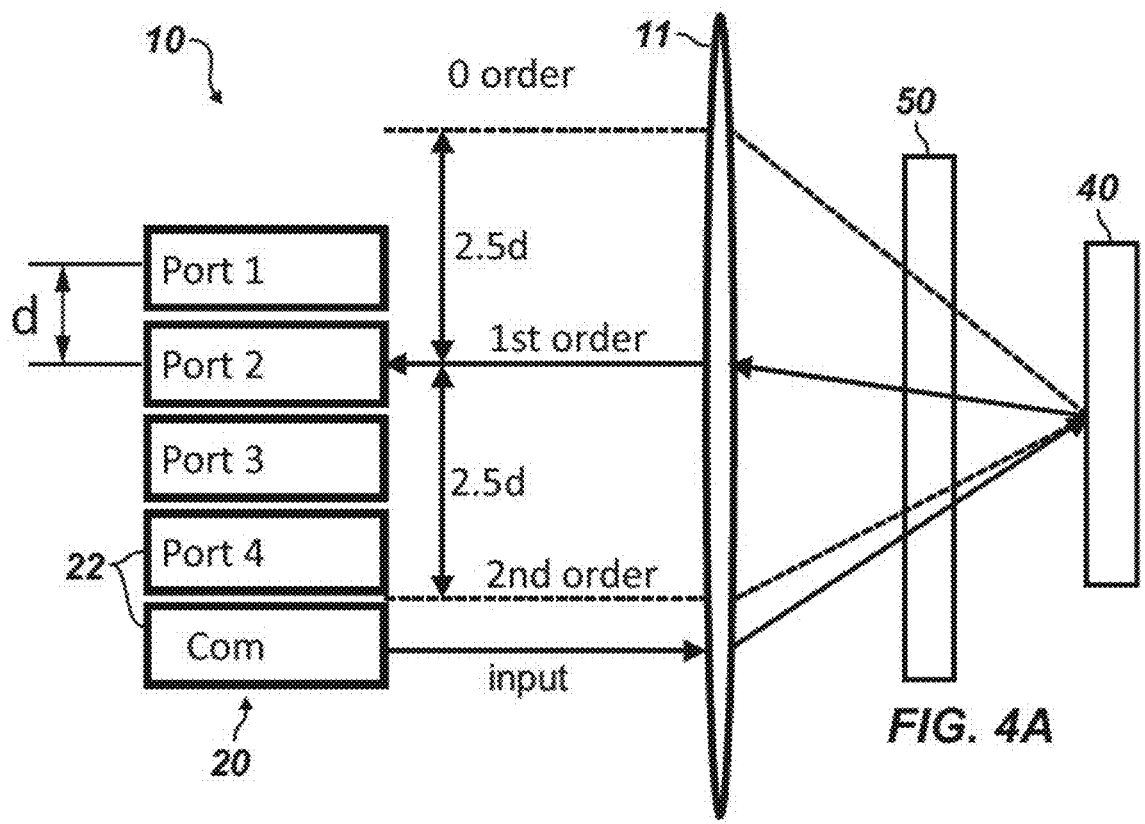
FIG. 4A illustrates a schematic view of a wavelength selective switch module in a target configuration.

As noted in the background, the incident angle on LCoS switch assembly 40 is typically controlled during the alignment of optical components to avoid unwanted diffraction orders and improve crosstalk during alignment. By design, the WSS module is constructed with a target configuration so that the unwanted second-order diffraction beams are directed at a half port offset in the space (d) between output ports 22. FIG. 4A illustrates a schematic view of the WSS module 10 having an example target configuration.

The fiber array 20, LCoS switch assembly 40, and tunable optical wedge 50 are schematically shown. Other elements, such as diffraction grating, optics, and the like, are simply represented as a diagramed feature 11.

An input beam is emitted from a communication port 22 of the fiber array 20. The first-order diffraction beam having the main power from the input beam is intended to be directed to a desired output port 22, such as "Port 2" as shown. In this simplified example, the second-order diffraction beam would be diffracted at 2.5 times the port spacing (d) so as not to be incident at an output port 22 and to avoid crosstalk. (As will be appreciated, the port spacing (d) may typically be set and uniform by design, but this is not strictly necessary as the teachings of the present disclosure can apply to other configurations. In the discussion that follows, uniform spacing (d) is assumed between all ports.)

Changing the beam incident angle on the LCoS switch assembly 40 can adjust the relative position between the zero-order diffraction beam and the output ports 22, as well as the relative position between the second-order diffraction beam and the output ports 22. If the position of the zero-order diffraction beam is a half port spacing (d/2) from the output ports 22, then the position for the second-order diffraction beam is also at a half port offset from the output ports. In this way, high port isolation can be achieved.

Figure 4B:
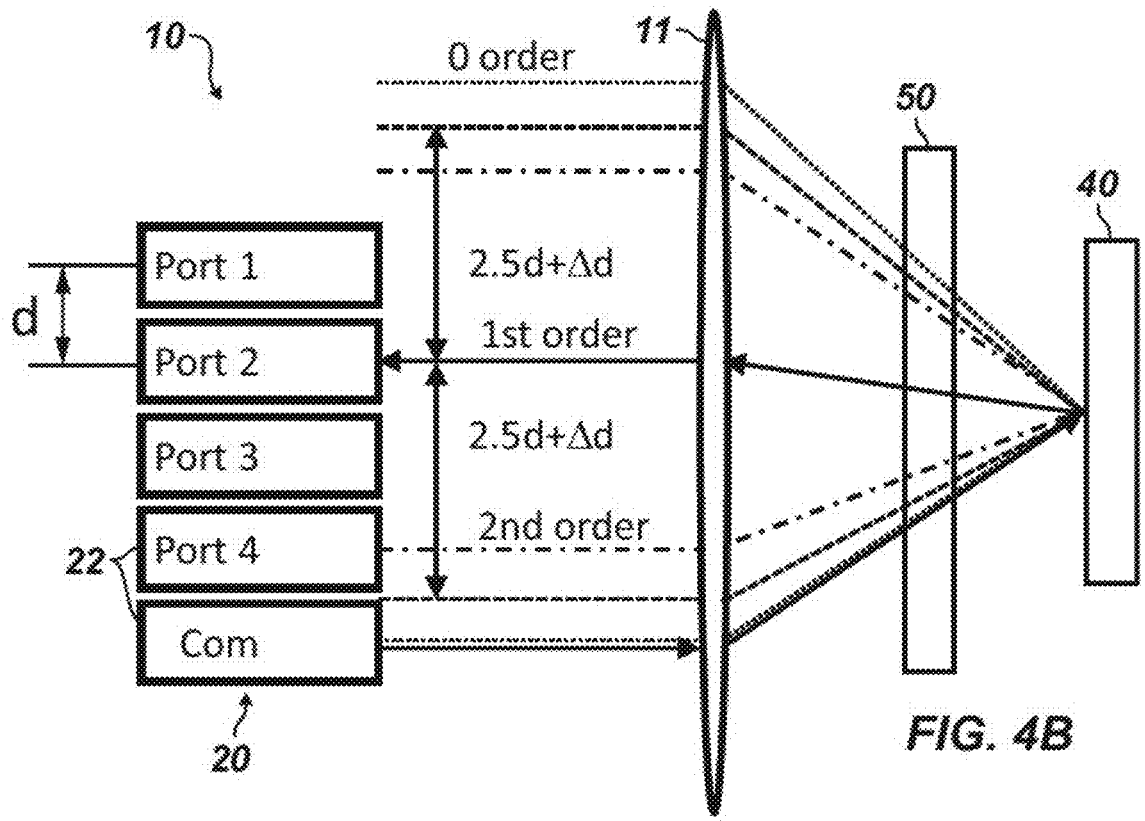
FIG. 4B illustrates a schematic view of the wavelength selective switch module in a resulting configuration.

In actuality, however, the second-order direction beam can shift over half a port distance from the designed target during assembly and use of the WSS module 10. In the worst case, the second-order beam may directly hit one of the output ports 22, producing crosstalk. For example, FIG. 4B illustrates a schematic view of the wavelength selective switch module 10 in a resulting configuration. As shown, the second-order diffraction beam has shifted an amount Δd to be incident at least partially at an output port 22 (e.g., Port 4), which produces undesired crosstalk.

In both of FIGS. 4A-4B, the tunable optical wedge 50 is shown in a default state so as not to actively adjust the beam directions. By itself, the wedge's optical elements, such as the plates of the LC cell, the LC material, etc., may alter the beam directions because the wedge 50 is placed adjacent the LCoS switch assembly 40. However, the target design of the WSS module 10 is configured to account for any default alteration. Importantly, however, the tunable optical wedge 50 can be controlled to actively adjust the input beam direction on the LCoS switch assembly 40 and to control the diffraction order beams relative to the output ports 22 of the fiber array 20.

Figure 4C:
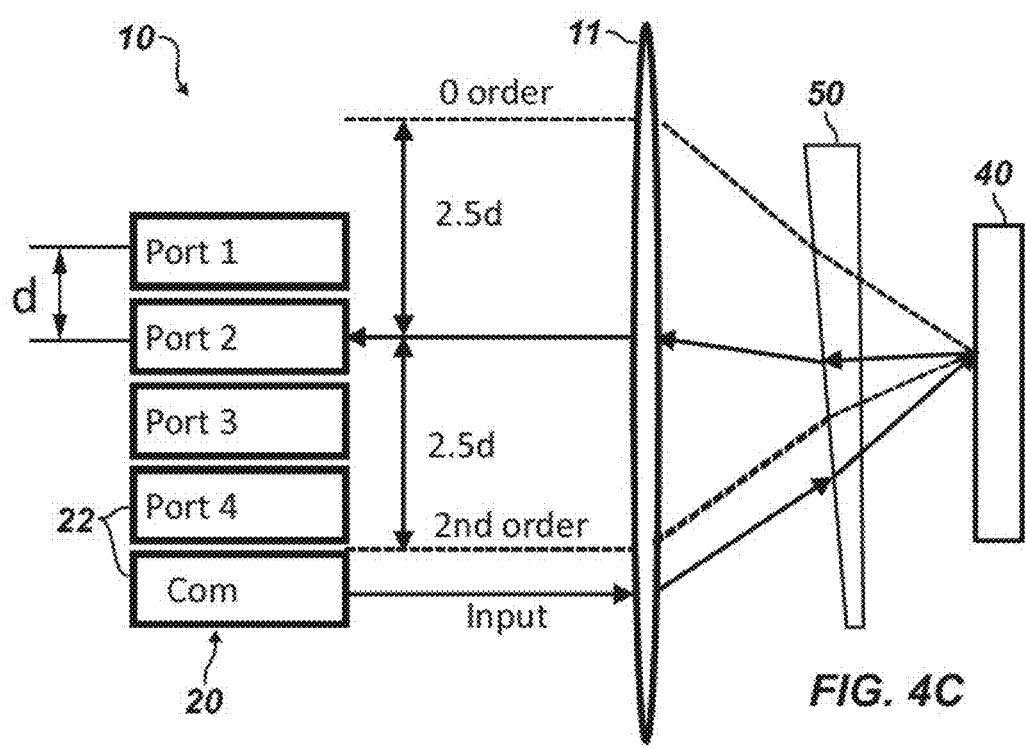
FIG. 4C illustrates a schematic view of a wavelength selective switch module having a tunable optical wedge in a corrected configuration.

FIG. 4C illustrates a schematic view of the VVWS module 10 having the tunable optical wedge 50 in an operational state to produce an optical equivalent. Here, the tunable optical wedge 50 is used to actively adjust the input beam direction on the LCoS switch assembly 40 of the WSS module 10. For example, bias voltages applied to the wedge 50 create a phase profile that functions as a "wedge" to adjust the steering angles of the propagating beams. In this example, the adjustment has corrected the misalignment seen in FIG. 4B so that the second-order diffraction beam is directed to an offset in the spacing (d) between output ports 22. In this simplified example, the second-order diffraction beam has been adjusted in FIG. 4C so that it is not incident on Port 4, as it was in FIG. 4B.

Figure 5:
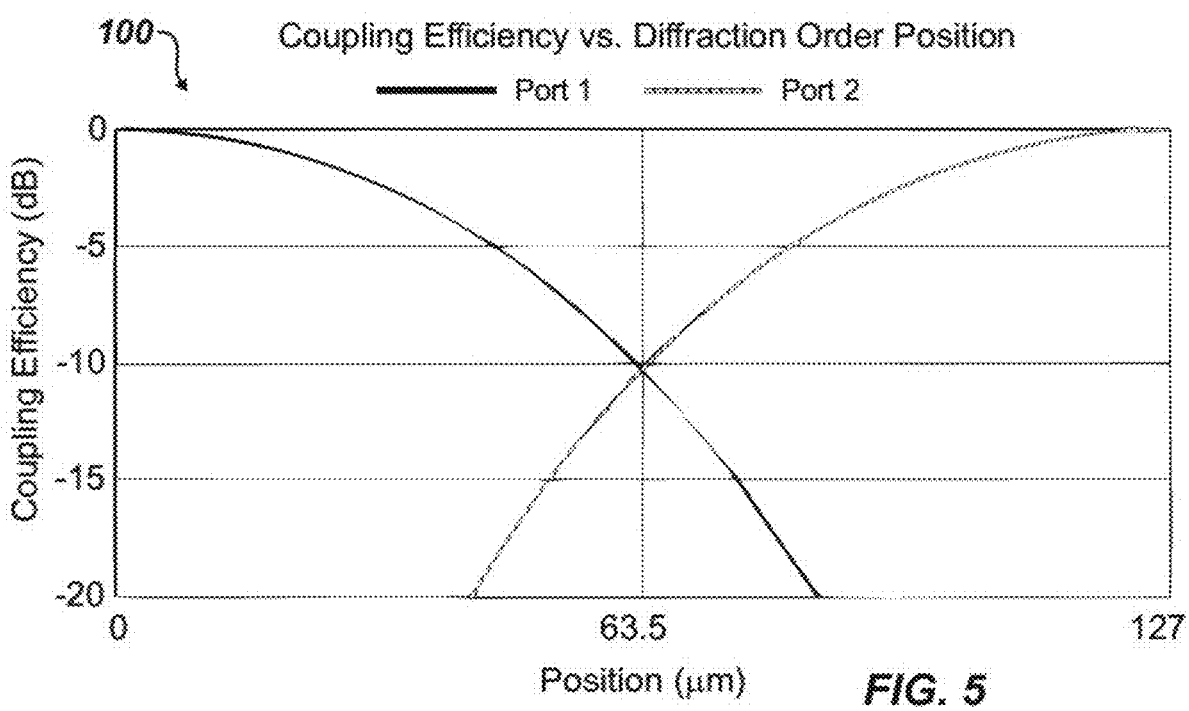
FIG. 5 illustrates a graph of coupling efficiency versus diffraction order position between adjacent fibers separated by a distance.

With an understanding of how the tunable optical wedge 50 can adjust the steering angles of the propagating beams, some discussion is provided on how the coupling efficiency of light relates to the position of a diffraction order beam between adjacent output ports. Namely, FIG. 5 illustrates a graph 100 to show how a diffraction order beam couples to adjacent output ports in a fiber array. In the graph 100, a position of a diffraction order beam is given between two adjacent output ports (Port 1, Port 2) separated by a distance (d) of 127 microns. The coupling efficiencies for both ports are graphed versus the position of the diffraction order beam. When the diffraction order beam is directed to a position between the two adjacent ports so that it is about half of the separation distance (d) from both, the coupling efficiencies for both ports are about −10 dB. Of course, if the diffraction order beam is directed more toward one of the ports, then the coupling efficiency increases for the one port and decreases for the other port. As will be appreciated, the WSS module (10) of the present disclosure can use this spacing (d) or any other spacing between output ports (22).

Figure 6:
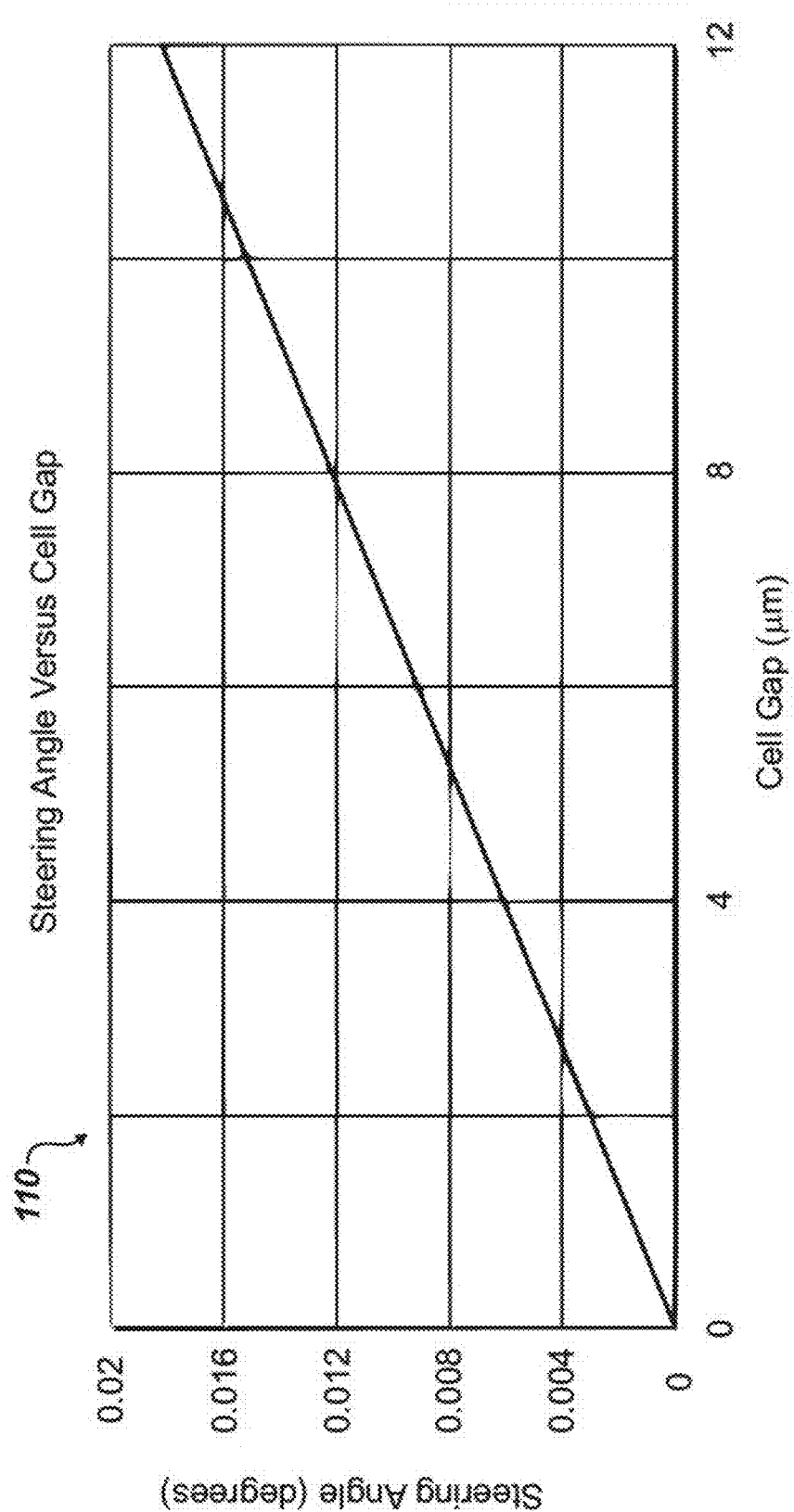
FIG. 6 illustrates a graph of steering angle versus cell gap.

Various steering angles can be achieved using the tunable optical wedge (50), and the required angle to direct second-order diffraction beams between output ports (22) depends on the size and geometric configuration of the components in the WSS module (10). To illustrate one example for output ports (22) separated by a distance (d) of 127 microns as in the previous example, FIG. 6 illustrates a graph 110 of steering angle versus cell gap (G) for the tunable optical wedge (50). In the example, the LC cell (52) of the wedge (50) can have a 4 mm linear phase region to cover the beams for all of the ports (22) in the WSS module (10). The cell gap (G) for the LC cell (52) of the wedge (50) is provided from 0 to 12 microns. In this example, a single pass steering angle of about 0.016 degrees can be required to create a half port offset. Thus, for the tunable optical wedge (50) having a 4 mm linear phase region to cover the beams of all ports (22) of the WSS module (10) in this example, the LC cell gap (G) of the wedge (50) can be about 10.5 µm so a suitable steering angle can be produced to direct the diffraction order beams in the space (d) between output ports (22). Other spatial configurations can be used depending on the implementation.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed is:

1. An apparatus, comprising:
    a plurality of ports being separated by port spacing, at least one of the ports being configured to transmit an input beam;
    a selective switch being configured to selectively direct a first order of a beam diffracted from the input beam for output to a selected one of other ports of the plurality of ports; and
    a tunable optical wedge arranged in optical communication with the selective switch and the plurality of ports, the tunable optical wedge being selectably tunable between a plurality of states in which a distance, at the plurality of ports, between the first order of the diffracted beam and an other order of the diffracted beam having a higher order than the first order (a "higher order") varies between the states, and the tunable optical wedge is configured, in one of the plurality of states, to direct a the higher order of the diffracted beam towards the port spacing between the ports and the first order of the diffracted beam toward the selected one of the other ports.

2. The apparatus of claim 1, wherein the ports comprise fibers of a fiber array optically coupled to collimators.

3. The apparatus of claim 1, wherein the selective switch comprises:
    a dispersion element arranged in optical communication with the input beam from the at least one port and configured to disperse the input beam into optical channels; and
    a switch assembly arranged in optical communication with the optical channels from the dispersion element, the switch assembly being liquid crystal based and having a plurality of pixels, the pixels being individually addressable to create a reconfigurable phase grating profile, the reconfigurable phase grating profile of the pixels being configured to selectively direct the first order of the diffracted beams from the switch assembly for output to the selected one of the other ports; and
    wherein the tunable optical wedge is arranged in optical communication with the switch assembly.

4. The apparatus of claim 3, further comprising:
    a lens arranged in optical communication with the dispersion element;
    a polarization optic arranged in optical communication with the ports; and
    an imaging mirror arranged in optical communication between the ports, the dispersion element, and the switch assembly.

5. The apparatus of claim 3, wherein the switch assembly comprises a liquid-crystal-on-silicon (LCoS) switch assembly having:
    a transparent layer having a transparent electrode;
    a silicon substrate having electrodes for the individually addressable pixels; and
    a liquid crystal material between the transparent layer and the silicon substrate.

6. The apparatus of claim 3, wherein the dispersion element comprises a diffraction grating.

7. The apparatus of claim 1, further comprising control circuitry arranged in operable communication with the selective switch.

8. The apparatus of claim 1, wherein to direct the higher order of the diffracted beams, the tunable optical wedge is configured to direct at least a second order of the diffracted beam towards the port spacing between the ports.

9. The apparatus of claim 1, wherein the tunable optical wedge comprises:
    a liquid crystal cell having spaced-apart resistive layers and having liquid crystal material disposed between the spaced-apart resistive layers;
    a first pair of contact regions defined between the spaced-apart resistive layer at a first end of the LC cell;
    a second pair of contact regions defined between the spaced-apart resistive layer at a second end of the LC cell; and
    an adjustable voltage source coupled to the first and second pairs of contact regions, the adjustable voltage source being configured to apply a first AC bias voltage to the spaced-apart resistive layers via the first pair of contact regions and being configured to apply a second AC bias voltage to the spaced-apart resistive layers via the second pair of contact regions, the first and second AC bias voltages being associated with a beam steering angle for a propagating optical beam.

10. The apparatus of claim 9, wherein the tunable optical wedge comprises control circuitry coupled to the adjustable voltage source, the control circuitry responsive to external commands associated with a defined beam steering angle and being configured to determine values for the first and second AC bias voltages associated with the defined beam steering angle to be applied by the adjustable voltage source.

11. A wavelength selective switch comprising:
a plurality of ports at least including at least one input port and two or more output ports, the at least one input port configured to transmit an input beam, the ports being separated by port spacing;
a dispersion element arranged in optical communication with the input beam from the at least one input port and configured to disperse the input beam into optical channels;
a switch assembly arranged in optical communication with the optical channels from the dispersion element, the switch assembly being liquid crystal based and having a plurality of pixels, the pixels being individually addressable to create a reconfigurable phase grating profile, the reconfigurable phase grating profile of the pixels being configured to selectively direct a first order of one or more diffracted beams of one or more of the optical channels from the switch assembly for output to selected one or more of the output ports; and
a tunable optical wedge arranged in optical communication with the switch assembly and the plurality of port, the tunable optical wedge being selectably tunable between a plurality of states in which a distance, at the plurality of ports, between the first order of the one or more diffracted beams and an other order of the diffracted beam having a higher order than the first order (a "higher order") varies between the states, and the tunable optical wedge is configured, in one of the plurality of states, to direct a-the higher order of the one or more diffracted beams towards the port spacing between the ports and the first order of the diffracted beam toward the selected one of the other ports.

12. The wavelength selective switch of claim 11, wherein the dispersion element comprises a diffraction grating arranged in optical communication with the input beam from the at least one input port and configured to disperse the input beam into optical channels.

13. The wavelength selective switch of claim 11, wherein the switch assembly comprises a liquid-crystal-on-silicon (LCoS) switch assembly arranged in optical communication with the optical channels from the dispersion element, the LCOS switch assembly having the plurality of pixels being independently addressable to create the reconfigurable phase profile grating, the reconfigurable phase grating profile of the pixels being configured to selectively direct the first-order of the one or more diffracted beams of the one or more of the optical channels from the LCOS switch assembly for output to the selected one or more of the output ports.

14. The wavelength selective switch of claim 13, wherein the tunable optical wedge comprises a liquid crystal cell arranged in optical communication with the LCOS switch assembly, the liquid crystal cell having spaced-apart resistive layers and having liquid crystal material disposed between the spaced-apart resistive layers, the liquid crystal material producing a phase profile in response to bias voltages applied to the spaced-apart resistive layers, the phase profile being configured to direct at least a second-order of the one or more of the diffracted beams towards the port spacing between the ports.

15. A method for processing an input beam, the method comprising:
transmitting the input beam from at least one input port of a plurality of ports, the plurality of ports at least including the at least one input port and two or more output ports, the plurality of ports being separated by a port spacing;
dispersing the input beam into optical channels;
selectively directing a first order of one or more diffracted beams of one or more of the optical channels by individually addressing pixels of a switch assembly to create a reconfigurable phase grating profile, and outputting the first order thereof to selected one or more of the output ports;
directing an other order of the diffracted beam having a higher order than the first order (a "higher order") toward the plurality of ports; and
selectably adjusting a distance, at the plurality of ports, between the first order of the diffracted beam and the higher order of the one or more diffracted beams by applying bias voltages to resistive layers within a tunable optical wedge and producing a phase profile in liquid crystal material between the resistive layers in response to the applied bias voltages.

16. The method of claim 15, further comprising:
focusing the input beam with a lens arranged in optical communication with a dispersion element;
controlling polarization of the input beam with a polarization optic arranged in optical communication with the ports; and
imaging the input beam with an imaging mirror arranged in optical communication between the ports, the dispersion element, and the switch assembly.

17. The method of claim 15, wherein the switch assembly comprises using a liquid-crystal-on-silicon (LCoS) switch assembly having:
a transparent layer having a transparent electrode;
a silicon substrate having electrodes for the independently addressable pixels; and
a liquid crystal material between the transparent layer and the silicon substrate.

18. The method of claim 15, wherein dispersing the input beam into the optical channels comprises dispersing the input beam using a diffraction grating.

19. The method of claim 15, wherein applying the bias voltages to the resistive layers comprises:
applying a first AC bias voltage of the bias voltages to the resistive layers via a first pair of contact regions at a first end of the resistive layers; and
applying a second AC bias voltage of the bias voltages to the resistive layers via a second pair of contact regions at a second end of the resistive layers.

20. The method of claim 19, wherein producing the phase profile comprises producing a defined beam steering angle for a propagating optical beam through the phase profile, the beam steering angle being associated with the first and second AC bias voltages.

21. The method of claim 20, further comprising receiving external commands associated with the defined beam steering angle; and determining values for the first and second AC bias voltage associated with the defined beam steering angle to be applied to the resistive layers.

* * * * *